United States Patent [19]

Kasahara

[11] Patent Number: 5,436,647
[45] Date of Patent: Jul. 25, 1995

[54] COLOR IMAGE FORMING APPARATUS

[75] Inventor: Nobuo Kasahara, Yokohama, Japan

[73] Assignee: Ricoh Company, Ltd., Tokyo, Japan

[21] Appl. No.: 70,900

[22] Filed: Jun. 3, 1993

[30] Foreign Application Priority Data

Jun. 3, 1992 [JP] Japan .................. 4-142853
Jun. 3, 1992 [JP] Japan .................. 4-142854

[51] Int. Cl.⁶ .................................. H04N 1/21
[52] U.S. Cl. .................................. 347/115
[58] Field of Search ............... 346/108, 160, 107 R, 346/76 L; 355/200, 202, 326, 327, 328; 358/296, 298, 300, 302

[56] References Cited

U.S. PATENT DOCUMENTS 4,847,654  7/1989  Honma et al. ............... 358/300

Primary Examiner—Mark J. Reinhart
Attorney, Agent, or Firm—Oblon, Spivak, McClelland, Maier & Neustadt

[57] ABSTRACT

A color image forming apparatus for electrostatically forming a latent image on a photoconductive element by controlling a laser in response to an image signal, and then performing development, image transfer and fixation to form a corresponding image on a sheet. A higher process speed for image formation and a higher scanning speed of a laser beam are selected in a monocolor image forming mode than in a full color image forming mode. The higher scanning speed may be replaced with a greater number of scanning lines.

7 Claims, 4 Drawing Sheets

COLOR IMAGE FORMING APPARATUS

BACKGROUND OF THE INVENTION

The present invention relates to a color image forming apparatus of the type electrostatically forming latent images by scanning a photoconductive element with a laser beam modulated by color image signals and developing each latent image by a toner of particular color, e.g., yellow, magenta, cyan or black. More particularly, the present invention is concerned with a color image forming apparatus selectively operable in a full color image forming mode using three or four colors or in a monocolor image forming mode.

An analog color electrophotographic copier of the type projecting a document image onto a photoconductive element is disclosed in Japanese Patent Laid-Open Publication No. 229041/1985. This copier selects a particular process speed in each of a full color and monocolor copy modes. A monocolor (black-and-white) printer capable of changing the process speed for image formation when the scanning density of a laser beam is changed is proposed in Japanese Patent Laid-Open Publication No. 224780/1989. Further, implementations for forming an image by use of a plurality of laser beams is taught in Japanese Patent Publication Nos. 49941/1982, 33019/1985, 45065/1989, 43294, etc.

Generally, the amount of toner to deposit on a sheet is three times to four times greater in a full color copy mode than in a black-and-white or monocolor copy mode. Further, since many of color documents carry graphic patterns thereon, their images occupy about three times greater area than the images of black-and-white documents which are, in many cases, texts. It follows that far greater fixing energy is consumed in the full color copy mode than in the black-and-white (or monocolor) copy mode. In the light of this, the speed and temperature for fixation are so selected as to implement the fixation of a full color copy. This, however, wastes substantial part of the fixing energy and, therefore, substantial part of the electric power when it comes to the fixation of a black-and-white (or monocolor) copy. It is to be noted that the fixing speed for a black-and-white (or monocolor) copy may be increased up to a speed about twice to four times (depending on the toner) as high as the fixing speed for a full color copy. Another problem is that since a stack of documents made up of full color copies and black-and-white copies are often copied together, the range of fixing temperatures satisfying both of the full color and black-and-white (or monocolor) fixing conditions is extremely limited. As a result, the fixing temperature has to be controlled with high precision. Moreover, since the toner also has to have a thermal characteristic accommodating a broad range of fixing temperatures, the range of resinous materials available for the toner is limited. Hence, it is extremely difficult to implement an optimal toner color characteristic and an optimal charging characteristic at the same time from the durability, safe environment and cost standpoint.

SUMMARY OF THE INVENTION

It is therefore an object of the present invention to provide a color image forming apparatus of the type electrostatically forming a latent image on a photoconductive element by controlling a laser in response to an image signal, and then performing development, image transfer and fixation to form a corresponding image on a sheet, which apparatus increases an image forming speed and saves power in a monocolor image forming mode, efficiently uses fixing energy, reduces a waiting time in the event of a change of image forming mode, insures desirable image quality, and enhances efficient image signal processing.

In accordance with the present invention, a color image forming apparatus for electrostatically forming a latent image on a photoconductive element by controlling a laser in response to an image signal, and then performing development, image transfer and fixation to form a corresponding image on a sheet comprises an inputting section for selectively designating one of image forming modes including a full color image forming mode and a monocolor image forming mode, a process control circuit for executing an image forming process matching the image forming mode designated on the inputting section, and a speed setting circuit for setting up a higher process speed for image formation and a higher scanning speed of a laser beam when the monocolor image forming mode is designated than when the full-color image forming mode is designated.

BRIEF DESCRIPTION OF THE DRAWINGS

The above and other objects, features and advantages of the present invention will become more apparent from the following detailed description taken with the accompanying drawings in which.

In the figures, the same or similar constituent parts are designated by like reference numerals.

DESCRIPTION OF THE PREFERRED EMBODIMENTS

Figure 1:
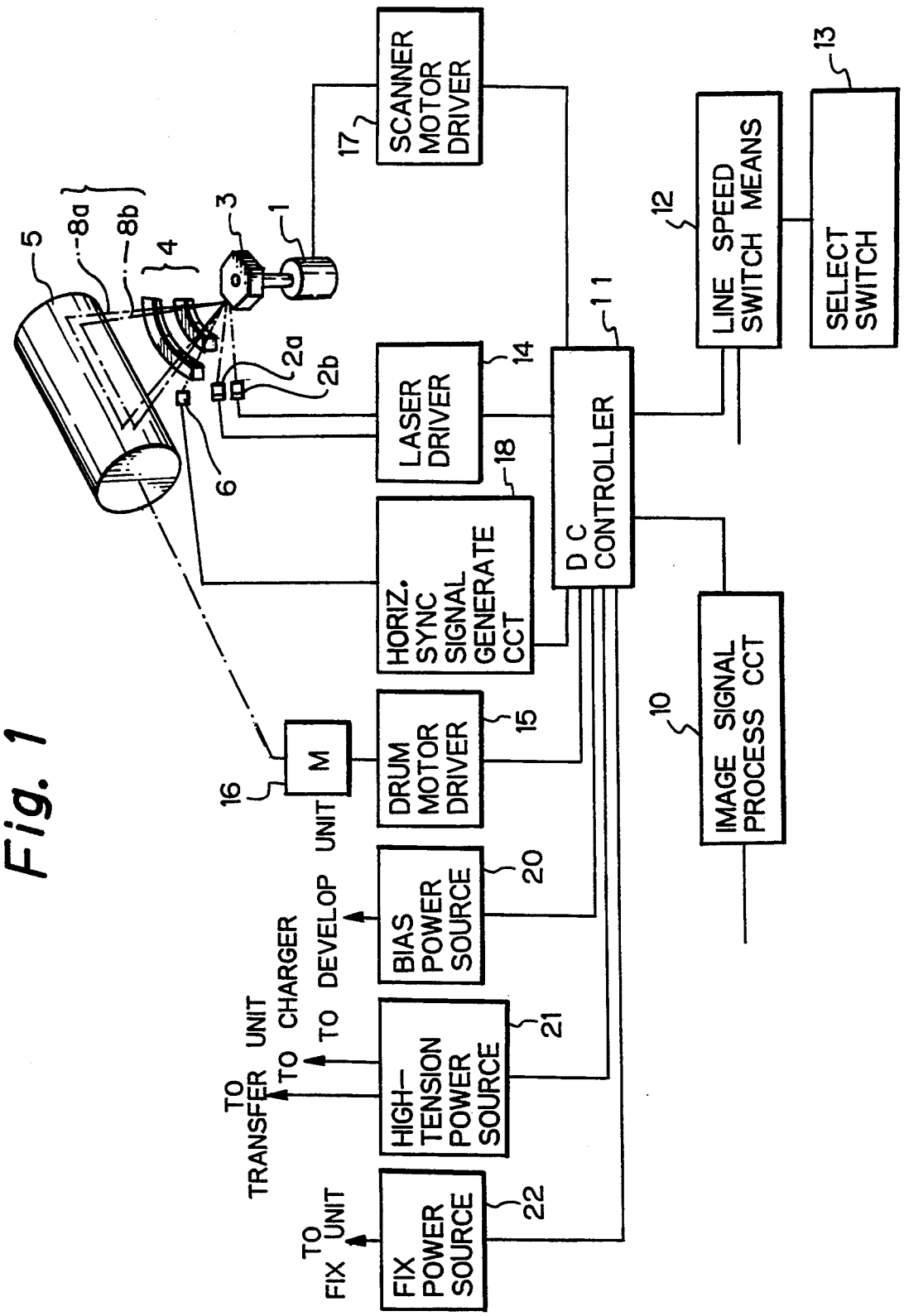
FIG. 1 is a block diagram schematically showing a control system representative of a color image forming apparatus embodying the present invention.
Figure 2:
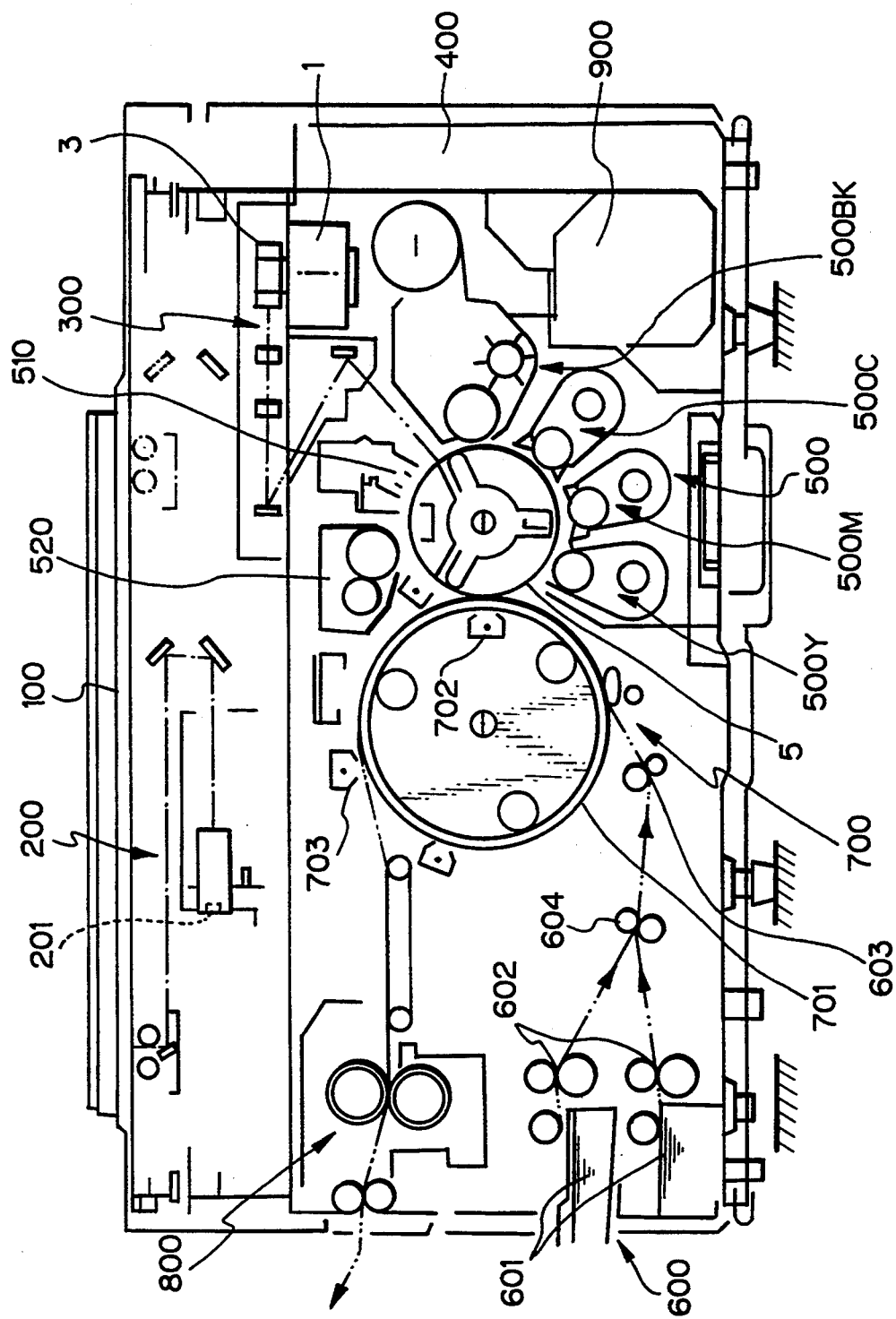
FIGS. 2–4 are sections each showing a specific construction of a full color copier to which the control system of FIG. 1 is applied.

Referring to FIG. 2 of the drawings, there is shown a specific construction of a color image forming apparatus of the type electrostatically forming a latent image on a photoconductive element by controlling a laser in response to an image signal and to which the present invention is applicable. As shown, a scanning section 200 includes a color CCD (Charge Coupled Device) image sensor 201 for reading an image of a document 100 and producing a corresponding electric signal (image data). An image processing section 400 performs optimal image processing with the electric signal and converts the processed signal to a color image signal representative of an image to record. A writing section 300 receives the color image signal from the image processing section 400 to reproduce the document image on a photoconductive drum 5. Various conventional units for effecting electrophotography (xerography) are arranged around the drum 5. Specifically, a main charger 510 uniformly charges the surface of the drum 5. As shown in FIG. 1, the writing section 300 has lasers 2a and 2b which emit laser beams 8a and 8b, respectively. The laser beams 8a and 8b are modulated by a particular color image signal and scans the charged surface of the drum 5. As a result, a latent image representative of the document image is formed on the drum 5. The laser beams 8a and 8b are incident to and deflected by a polygonal mirror 3 being rotated by a scanner motor 1. The laser beams 8a and 8b from the mirror 3 are each focused in the form of a spot on the drum 5 by conventional f-theta lenses 4.

A developing section 500 develops the latent image by a toner to produce a corresponding toner image. The developing section 500 has a yellow developing unit 500Y, a magenta developing unit 500M, a cyan developing unit 500C, and a black developing unit 500Bk. For details of the developing section 500, a reference may be made to, for example, U.S. Pat. No. 4,928,144. A cleaning section 520 removes the toner remaining on the drum 5 after the transfer of the toner image which will be described.

On the other hand, a sheet feed section 600 is loaded with a stack of sheets 601. A pick-up roller 602 feeds the sheets 601 one by one toward an image transfer section 700 via a transport roller 604 and a register roller 603. The image transfer section 700 is available in various forms as taught in, for example, Japanese Patent Publication Nos. 34467/1988, 34468/1988 and 55068/1988, and U.S. Pat. Nos. 4,835,582, 4,862,214, 4,864,358 and 4,872,037. While a transfer drum 701 drives the sheet 601, a transfer charger 702 transfers the toner image from the drum 5 to the sheet 601. To produce a black-and-white copy, a black toner image is formed on the drum 5 by the black developing unit 500Bk and then transferred to the sheet 601. Hence, the formation of a latent image, development of the latent image and transfer of the resulting toner image are each effected only once. In the event of full color copying (printing), such a sequence of image forming steps are repeated with each of Y, M and C, i.e., three times in total or with each of Y, M, C and Bk, i.e., four times in total. The sheet 601 carrying the toner image thereon is separated from the transfer drum 701 at a sheet separating section 703 and then transported to a fixing section 800 to have the toner image fixed thereon. Finally, the sheet or copy 701 is driven out of the apparatus. In FIG. 2, the reference numeral 900 designates a power source.

Figure 3:
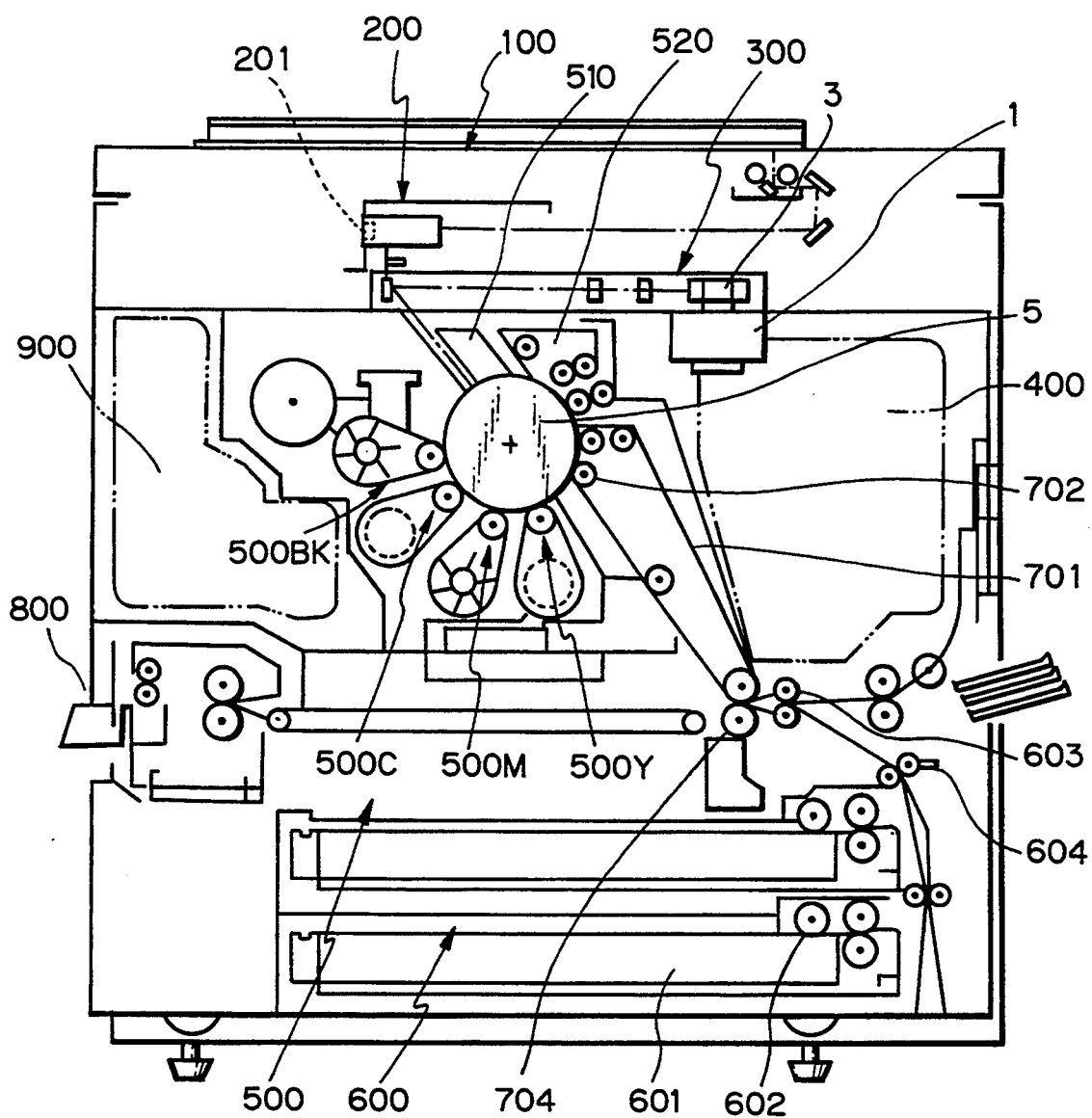

FIG. 3 shows another specific construction of the color image forming apparatus of the type described. As shown, a scanning section 200 includes a color CCD (Charge Coupled Device) image sensor 201 for reading an image of a document 100 and producing a corresponding electric signal (image data). An image processing section 400 performs optimal image processing with the electric signal and converts the processed signal to a color image signal representative of an image to record. A writing section 300 receives the color image signal from the image processing section 400 to reproduce the document image on a photoconductive drum 5. Various conventional units for effecting electrophotography (xerography) are arranged around the drum 5. Specifically, a main charger 510 uniformly charges the surface of the drum 5. As also shown in FIG. 1, the writing section 300 has lasers 2a and 2b which emit laser beams 8a and 8b, respectively. The laser beams 8a and 8b are modulated by a particular color image signal and scans the charged surface of the drum 5. As a result, a latent image representative of the document image is formed on the drum 5. The laser beams 8a and 8b are incident on and deflected by a polygonal mirror 3 being rotated by a scanner motor 1. The laser beams 8a and 8b from the mirror 3 are each focused in the form of a spot on the drum 5 by conventional f-theta lenses 4.

A developing section 500 develops the latent image by a toner to produce a corresponding toner image. The developing section 500 has a yellow developing unit 500Y, a magenta developing unit 500M, a cyan developing unit 500C, and a black developing unit 500Bk. For details of the developing section 500, a reference may be made to, for example, U.S. Pat. No. 4,928,144, as mentioned earlier. A cleaning section 520 removes the toner remaining on the drum 5 after the transfer of the toner image. The toner image formed on the drum 5 is transferred to an intermediate transfer body 701.

On the other hand, a sheet feed section 600 is loaded with a stack of sheets 601. A pick-up roller 602 feeds the sheets 601 one by one toward a secondary transfer roller 704. The secondary transfer roller 704 is shown and described in, for example, Japanese Patent Laid-Open Publication Nos. 182766/1987 and 12870/1990.

In the event of black-and-white copying (printing), a black toner image is transferred to the intermediate transfer body 701 and then transferred to the sheet 601 by the secondary transfer roller 704. Hence, the image transfer is effected only once. In the event of full color copying (printing), a sequence of image forming steps (formation of a latent image, development of the latent image, and transfer of the resulting toner image to the intermediate transfer body 701) are repeated three times with three of Y, M, C and Bk or four times with all of Y, M, C and Bk. The composite toner image transferred to the intermediate transfer body 701 is bodily transferred to the sheet 601 by the secondary transfer roller 704. The sheet 601 carrying the toner image is transported to a fixing and discharging section 800. This section fixes the toner image on the sheet 601 and drives the sheet 601 to the outside of the apparatus.

Figure 4:
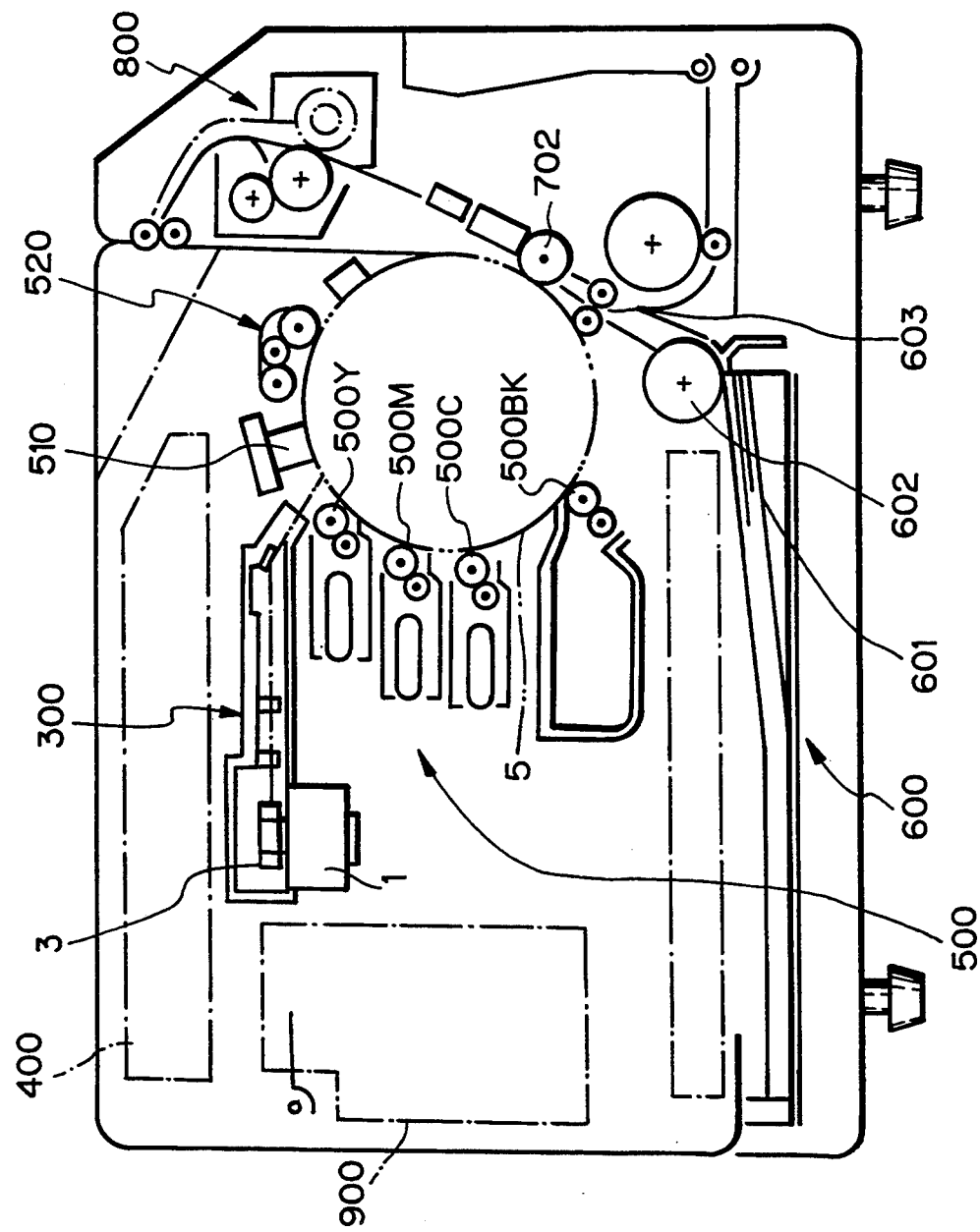

FIG. 4 shows still another specific construction of the color image forming apparatus of the type described. An image signal from, for example, a work station or a personal computer (mainly image data read by an independent scanner) is sent to an image processing section 400. Then, the image processing section performs optimal image processing with the image signal and converts the processed signal to a color image signal representative of an image to record. A writing section 300 receives the color image signal from the image processing section 400 to reproduce the document image on a photoconductive drum 5. Various conventional units for effecting electrophotography (xerography) are arranged around the drum 5. Specifically, a main charger 510 uniformly charges the surface of the drum 5. As also shown in FIG. 1, the writing section 300 has lasers 2a and 2b which emit laser beams 8a and 8b, respectively. The laser beams 8a and 8b are modulated by a particular color image signal and incident on a polygonal mirror 3 being rotated by a scanner motor 1. As a result, the laser beams 8a and 8b are deflected by the mirror 3 and then focused by the f-theta lenses 4 onto the charged surface of the drum 5, thereby electrostatically forming a latent image on the drum 5.

A developing section 500 develops the latent image by a toner to produce a corresponding toner image. The developing section 500 has a yellow developing unit 500Y, a magenta developing unit 500M, a cyan developing unit 500C, and a black developing unit 500Bk. A cleaning section 520 removes the toner remaining on the drum 5 after the image transfer.

On the other hand, a sheet feed section 600 is loaded with a stack of sheets 601. A pick-up roller 602 feeds the sheets 601 one by one toward an image transfer station.

In the event of black-and-white printing, a black toner image is transferred to the sheet 601, i.e., the image transfer is effected only once. In the event of full color printing, a sequence of image forming steps are repeated three times with three of Y, M, C and Bk or four times with all of Y, M, C and Bk. The composite toner image formed on the drum 5 is bodily transferred to the sheet 601 by a transfer roller 702. The sheet 601 carrying the toner image is transported to a fixing and discharging section 800. This section 800 fixes the toner image on the sheet 601 and drives the sheet 601 to the outside of the apparatus.

In a color electrophotographic copier (or printer) implemented by any one of the conventional systems, the process speed for image formation, including exposure, development and image transfer, is maintained constant. Therefore, the period of time necessary for a black-and-white copy (or print) to be produced by a machine having a black developing unit or for a yellow, magenta or cyan copy (or print) to be produced by a machine having developing units of three colors with or without black is only one-third or one-fourth of the period of time necessary for a three- or four-color copy (or print) to be produced.

On the other hand, assuming the same original document, the amount of toner to deposit on a sheet is three times to four times greater in a full color copy mode than in a black-and-white or monocolor copy mode. Further, since many of color documents carry graphic patterns thereon, their images occupy about three times greater area than the images of black-and-white documents which are, in many cases, texts. It follows that far greater fixing energy is consumed in the full copy copy mode than in the black-and-white copy (or monocolor copy) mode. In the light of this, the speed and temperature for fixation are so selected as to implement the fixation of a full color copy. This, however, wastes substantial part of the fixing energy and, therefore, substantial part of the electric power when it comes to the fixation of a black-and-white (or monocolor) copy. It is to be noted that the fixing speed for a black-and-white (or monocolor) copy may be increased up to a speed about twice to four times (depending on the toner) as high as the fixing speed for a full color copy. Another problem is that since a stack of documents made up of full color copies and black-and-white copies are often copied together, the range of fixing temperatures satisfying both of the full color and black-and-white (or monocolor) fixing conditions is extremely limited. As a result, the fixing temperature has to be controlled with high precision. Moreover, since the toner also has to have a thermal characteristic accommodating a broad range of fixing temperatures, the range of resinous materials available for the toner is limited. Hence, it is extremely difficult to implement an optimal toner color characteristic and an optimal charging characteristic at the same time from the durability, safe environment and cost standpoint.

Preferred embodiments of the color image forming apparatus in accordance with the present invention will be described hereinafter.

FIG. 1 shows a control system applicable to the full color copier shown in any one of FIGS. 2, 3 and 4 or any other full color copier or printer of the type concerned. As shown, the control system has an image signal processing circuit 10, a DC controller 11, scanning line speed changing means 12, and a switch 13 for selecting an image forming mode. Assume that the switch 13 is operated to select a full color copy mode 1 (four colors), a full color copy mode 2 (three colors), a two color copy mode (color by color; color designation available), or a monocolor copy mode (color by color; color designation available). Then, the scanning line speed control means reads out of a look-up table (memory) image forming process speed data matching the designated mode, e.g., a rotation speed of the scanner motor, an image signal rate, a rotation speed of a drum motor 16, a charger voltage, a bias voltage for development, and a transfer unit voltage. Such image forming process speed data are applied to the DC controller 11. In response, the DC controller 11 feeds the input process speed data to a laser driver 14, a drum motor driver 15, a bias power source 20, and a high-tension power source 21 for image transfer and charging. Specifically, a signal for changing the rotation speed of the polygonal mirror 3 is fed to a scanner motor driver 17 while a signal for changing the rotation speed of a photoconductive drum 5 is applied to the drum motor driver 15. Further, the DC controller 11 sends signals to the bias power source 20 and high-tension power source 21 for changing their outputs. There are also shown in FIG. 1 a horizontal synchronization (sync) sensor 6, a horizontal sync signal generating circuit 18, and a power source 22 for fixation. The switch 13 is provided on an operation panel, not shown, which is mounted on the apparatus body.

In a preferred embodiment of the present invention, a full color image and a monocolor image are each formed at a particular process speed and at a particular laser scanning speed. In the case of a copier, the switch 13 shown in FIG. 1 is operated to output a signal designating a desired copy mode, e.g., a full color, black-and-white or any other monocolor copy mode. The switch 13 may be implemented by a touch key provided on the body of a usual copier or a signal from a conventional automatic document identifying device. In the case of a printer, a signal indicative of a black-and-white, monocolor or similar record mode is sent from, for example, a personal computer or a work station to the scanning line speed control changing means 12. In response, the changing means 12 commands, for example, the scanner motor driver 17 a particular rotation speed matching the designated mode via the DC controller 11. Specifically, the scanner motor 1 and other similar constituents are so controlled as to set up a desired process speed while, at the same time, process conditions including the bias for development, image transfer and charge are made appropriate via the bias power source 20, high-tension power source 21 and so forth. Regarding black and white (or monocolor), the rotation speed of the polygonal mirror 3, i.e., the scanning speed of the laser beams 8a and 8b is increased. Further, the rotation speed of the drum motor 16 is so switched over as to match the peripheral speed of the drum 5, i.e., the image forming process speed to the scanning speed of the laser beams 8a and 8b. Also, the bias for development, transfer and charging which are other process conditions are switched to values matching the scanning speed via the bias power source 20 and high-tension power source 21.

The scanner motor 1 for driving the polygonal mirror 3 is variable in speed. The scanning speeds of the laser beams at the time of forming a full color image and at the time of forming a monocolor image greatly depend on the economy of the scanner motor 1 and image signal processing circuit 10. Also, the ratio between the scanning speed for forming a full color image and the scanning speed for forming a monocolor image has great influence on the cost and reliability of the operation of the image signal processing circuit 10. Therefore, considering economy and efficiency, it is preferable that the scanning speed V associated with a monocolor image be higher than the scanning speed v associated with a full color image such that a ratio n=V/v lies in the range of 2 to 4.

As for a power source assigned to the fixing unit, it is not necessary to switch the power for each of full color, black and white, and monocolor.

In an alternative embodiment of the present invention, a particular number of scanning lines of laser beams is set up for each of a full color copy mode and a monocolor copy mode. The process speed is changed depending on the kind of an image, as in the previous embodiment. In the case of a copier, the switch 13 shown in FIG. 1 is operated to output a signal designating a desired copy mode, e.g., a full color, black-and-white or monocolor copy mode. Again, the switch 13 may be implemented by a touch key provided on the body of a usual copier or a signal from a conventional automatic document identifying device. In the case of a printer, a signal indicative of a black-and-white, monocolor or similar record mode is sent from, for example, a personal computer or a work station to a line number changing means 12. In response, the changing means 12 commands, for example, the scanner motor driver 17 a rotation speed matching the designated mode via the DC controller 11. Specifically, the drum motor 16 and other similar constituents are so controlled as to set up a desired process speed while, at the same time, process conditions including the bias for development, image transfer and charge are made appropriate via the bias power source 20, high-tension power source 21 and so forth. Regarding black and white (or monocolor), one of the two semiconductor lasers 2a and 2b is driven. The rest of the control is the same as in the previous embodiment.

To enhance image quality, a laser beam spot may be modulated by a conventional arrangement. Specifically, a single dot is often provided with multiple levels for full color image recording or with two levels for black-and-white and other monocolor image recording. In accordance with the present invention, modulating means (power modulation and/or pulse width modulation), not shown, is built in the laser driver 14. The modulating means provides a single dot with multiple levels in the case of a full color image or with two levels in the case of a black-and-white or any other monocolor image. The scanner motor 1 for driving the polygonal mirror 3 is rotated at a constant speed with no regard to the kind of an image, i.e., a full color image or a monocolor image. Also, the power source 22 assigned to the fixing unit does not have to have the power thereof switched over. Assume that the number of scanning lines is n in the full color copy mode or N in the monocolor copy mode. Then, the process speed V for forming a monocolor image is selected to be V=(N/n)v where v is the process speed for forming a full color image. The numbers of scanning lines n and N in the full color mode and the monocolor mode, respectively, are open to choice so long as a relation N>n holds.

In summary, it will be seen that the present invention provides a color image forming apparatus having various unprecedented advantages, as enumerated below.

(1) The copying (or printing) speed is increased in a monocolor copy (or print) mode to promote energy saving. The copying speed in a black-and-white or monocolor copy mode available with a conventional apparatus is only about three to four times higher than in a full color copy mode. By contrast, the apparatus of the present invention achieves six times or more higher copying speed in the black-and-white or monocolor copy mode while consuming the same power as the conventional apparatus.

(2) When the copy (or print) mode is switched over, the waiting time is reduced. Specifically, since the apparatus automatically changes the image forming conditions in matching relation to the process speed, a stabilizing time is not necessary and, therefore, the operator can use the apparatus without any waiting time. Particularly, since the set fixing condition (temperature) has only to be held constant, a period of time for stabilizing the fixing temperature is not necessary when the mode is changed from, for example, a full color mode to a black-and-white mode or vice versa. Further, since a polygonal mirror should only be rotated at a constant speed, it is not necessary to change the target speed thereof when the mode is changed from, for example, a full color mode to a black-and-white or any other monocolor mode or vice versa. This prevents the operator from waiting until the rotation speed has been stabilized at the target speed.

(3) Image quality is enhanced since the image forming conditions are automatically changed in matching relation to the process speed. Image quality is further enhanced since the margin available for the fixing condition is great enough to stabilize the fixing ability, i.e., the range of toners applicable to the apparatus is broadened. To improve the quality of a color image, it is necessary to provide a single dot with multiple levels. By contrast, as for a black-and-white or any other monocolor image, a single dot is provided with two levels since it is, in many cases, constituted by characters, numerals or lines printed on a text or an illustration. To provide a single dot with multiple levels, a laser beam is modulated by power modulation and/or pulse width modulation which needs accurate control. This control becomes more difficult as the number of scanning lines increases. Regarding two levels, the beam spot can be accurately controlled despite the increase in the number of scanning lines.

(4) The rotation speed of the polygonal mirror remains constant with no regard to the kind of an image, i.e., a full color, black-and-white or any other monocolor image. Hence, the pixel frequency for image signal processing should only be maintained constant, enhancing efficient, economical and reliable signal processing.

Various modifications will become possible for those skilled in the art after receiving the teachings of the present disclosure without departing from the scope thereof.

What is claimed is:

1. A color image forming apparatus for electrostatically forming a latent image on a photoconductive element by controlling a laser in response to an image signal, and then performing development, image transfer and fixation to form a corresponding image on a sheet, said apparatus comprising:

inputting means for selectively designating one of image forming modes including a full color image forming mode and a monocolor image forming mode;

process control means for executing an image forming process matching the image forming mode designated on said inputting means; and speed setting means for setting up a higher process speed for image formation and a higher scanning speed of a laser beam when the monocolor image forming mode is designated than when the full-color image forming mode is designated.

2. An apparatus as claimed in claim 1, wherein said speed setting means sets image forming speeds v and V in the full color image forming mode and the monocolor image forming mode, respectively, which are in a ratio of n=V/v=2, 3 or 4, while setting a scanning speed of a laser beam of Vs=n·v in the monocolor image forming mode.

3. A color image forming apparatus for electrostatically forming a latent image on a photoconductive element by controlling a laser in response to an image signal, and then performing development, image transfer and fixation to form a corresponding image on a sheet, said apparatus comprising:

inputting means for selectively designating one of image forming modes including a full color image forming mode and a monocolor image forming mode;

process control means for executing an image forming process matching the image forming mode designated on said inputting means; and switching means for selecting a particular process speed for image formation and a particular number of scanning lines of a laser beam in each of the full color image forming mode and the monocolor image forming mode.

4. An apparatus as claimed in claim 3, wherein said switching means selects a higher process speed in the monocolor image forming mode than in the full color image forming mode.

5. An apparatus as claimed in claim 3, wherein said switching means selects a greater number of scanning lines in the monocolor image forming mode than in the full color image forming mode.

6. An apparatus as claimed in claim 3, wherein assuming that the numbers of scanning lines are respectively n and N in the full color image forming mode and the monocolor image forming mode, said switching means allows a process speed V in a monocolor image forming mode to have a relation V=(N/n)v with a process speed v in the full color image forming mode.

7. An apparatus as claimed in claim 3, wherein said switching means causes a laser beam spot to be modulated by a particular modulation mode in the monocolor image forming mode which is different from a modulation mode for the full color image forming mode.

* * * * *